(12) United States Patent
Mizunuma et al.

(10) Patent No.: US 10,248,234 B2
(45) Date of Patent: *Apr. 2, 2019

(54) OPERATION PROCESSING DEVICE AND OPERATION PROCESSING METHOD FOR DISPLAYING IMAGE BASED ON ORIENTATION OF OUTPUT DIRECTION

(71) Applicant: SONY CORPORATION, Tokyo (JP)

(72) Inventors: Hiroyuki Mizunuma, Tokyo (JP); Takuro Noda, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,519

(22) Filed: Jan. 10, 2018

(65) Prior Publication Data

US 2018/0129318 A1   May 10, 2018

Related U.S. Application Data

(63) Continuation of application No. 14/409,620, filed as application No. PCT/JP2013/068081 on Jul. 2, 2013, now Pat. No. 9,891,729.

(30) Foreign Application Priority Data

Jul. 10, 2012 (JP) ................................ 2012-154229

(51) Int. Cl.
*G06F 1/16* (2006.01)
*G06T 3/60* (2006.01)
(Continued)

(52) U.S. Cl.
CPC .............. *G06F 3/041* (2013.01); *G06F 1/169* (2013.01); *G06F 1/1618* (2013.01);
(Continued)

(58) Field of Classification Search
None
See application file for complete search history.

(56) References Cited

U.S. PATENT DOCUMENTS 5,268,817 A * 12/1993 Miyagawa ............ G06F 1/1618
361/679.06
5,481,430 A * 1/1996 Miyagawa ............ G06F 1/1618
16/223
(Continued)

FOREIGN PATENT DOCUMENTS

JP      08-194667      7/1996
JP      2002-278515 A  9/2002
(Continued)

OTHER PUBLICATIONS

Notice of Allowance for U.S. Appl. No. 14/409,620, dated Oct. 5, 2017, 05 pages.

(Continued)

*Primary Examiner* — David D Davis
(74) *Attorney, Agent, or Firm* — Chip Law Group

(57) ABSTRACT

There is provided an operation processing device including an input direction acquisition unit configured to acquire information indicating an input direction according to a direction generated in response to an operation indicating the direction which is performed on an input unit to which the operation is input, an output direction indication unit configured to indicate, to a display unit configured to display an image, an output direction that is a direction in which the image of the display unit is changed in response to the operation on the input unit, and a determination unit configured to determine an orientation of the output direction with respect to the input direction according to a relative position relationship between the input unit and the display unit.

12 Claims, 10 Drawing Sheets

(51) Int. Cl.
*G06F 3/041* (2006.01)
*G06F 3/0485* (2013.01)
*G06F 3/0488* (2013.01)

(52) U.S. Cl.
CPC .......... *G06F 1/1643* (2013.01); *G06F 1/1652* (2013.01); *G06F 1/1677* (2013.01); *G06F 3/0485* (2013.01); *G06F 3/0488* (2013.01); *G06T 3/60* (2013.01); *G06F 2203/04102* (2013.01); *G09G 2354/00* (2013.01); *G09G 2380/02* (2013.01); *G09G 2380/14* (2013.01)

(56) References Cited

U.S. PATENT DOCUMENTS

| | | | | |
|---|---|---|---|---|
| 5,719,799 | A * | 2/1998 | Isashi | G06F 1/1618 345/169 |
| 2003/0103087 | A1* | 6/2003 | Hatakeyama | G06F 1/162 715/815 |
| 2004/0001049 | A1* | 1/2004 | Oakley | G06F 1/1618 345/173 |
| 2004/0001306 | A1* | 1/2004 | Oakley | G06F 1/1618 361/679.1 |
| 2005/0093827 | A1* | 5/2005 | Endo | G06F 1/16 345/168 |
| 2010/0245106 | A1* | 9/2010 | Miller | G06F 1/1618 340/686.1 |
| 2010/0245209 | A1* | 9/2010 | Miller | G06F 1/1618 345/1.3 |
| 2010/0321275 | A1* | 12/2010 | Hinckley | G06F 1/1618 345/1.3 |
| 2011/0169754 | A1* | 7/2011 | Miyazawa | G06F 1/1616 345/173 |
| 2013/0229568 | A1* | 9/2013 | Belesiu | G06F 1/1618 348/372 |
| 2014/0043259 | A1* | 2/2014 | Park | G06F 3/0412 345/173 |
| 2014/0071608 | A1* | 3/2014 | Masaoka | G06F 1/1656 361/679.26 |
| 2014/0152576 | A1* | 6/2014 | Kim | G06F 3/03545 345/169 |
| 2015/0116362 | A1* | 4/2015 | Aurongzeb | G06F 3/1423 345/650 |
| 2015/0116364 | A1* | 4/2015 | Aurongzeb | G06F 3/0487 345/659 |

FOREIGN PATENT DOCUMENTS

| | | |
|---|---|---|
| JP | 2003-058316 A | 2/2003 |
| JP | 2009-031368 A | 2/2009 |
| JP | 2010-135967 A | 6/2010 |
| JP | 2012-057662 A | 3/2012 |

OTHER PUBLICATIONS

Non-Final Office Action for U.S. Appl. No. 14/409,620, dated Jan. 3, 2017, 11 pages.
Advisory Action for U.S. Appl. No. 14/409,620, dated Nov. 17, 2016, 02 pages.
Final Office Action for U.S. Appl. No. 14/409,620, dated Aug. 12, 2016, 10 pages.
Non-Final Office Action for U.S. Appl. No. 14/409,620, dated Jan. 20, 2016, 08 pages.
International Search Report and Written Opinion of PCT Application No. PCT/JP2013/068081, dated Aug. 20, 2013, 07 pages of English Translation and 07 pages of ISRWO.
International Preliminary Report on Patentability of PCT Application No. PCT/JP2013/068081, dated Jan. 22, 2015, 08 pages of English Translation and 04 pages of IPRP.

* cited by examiner

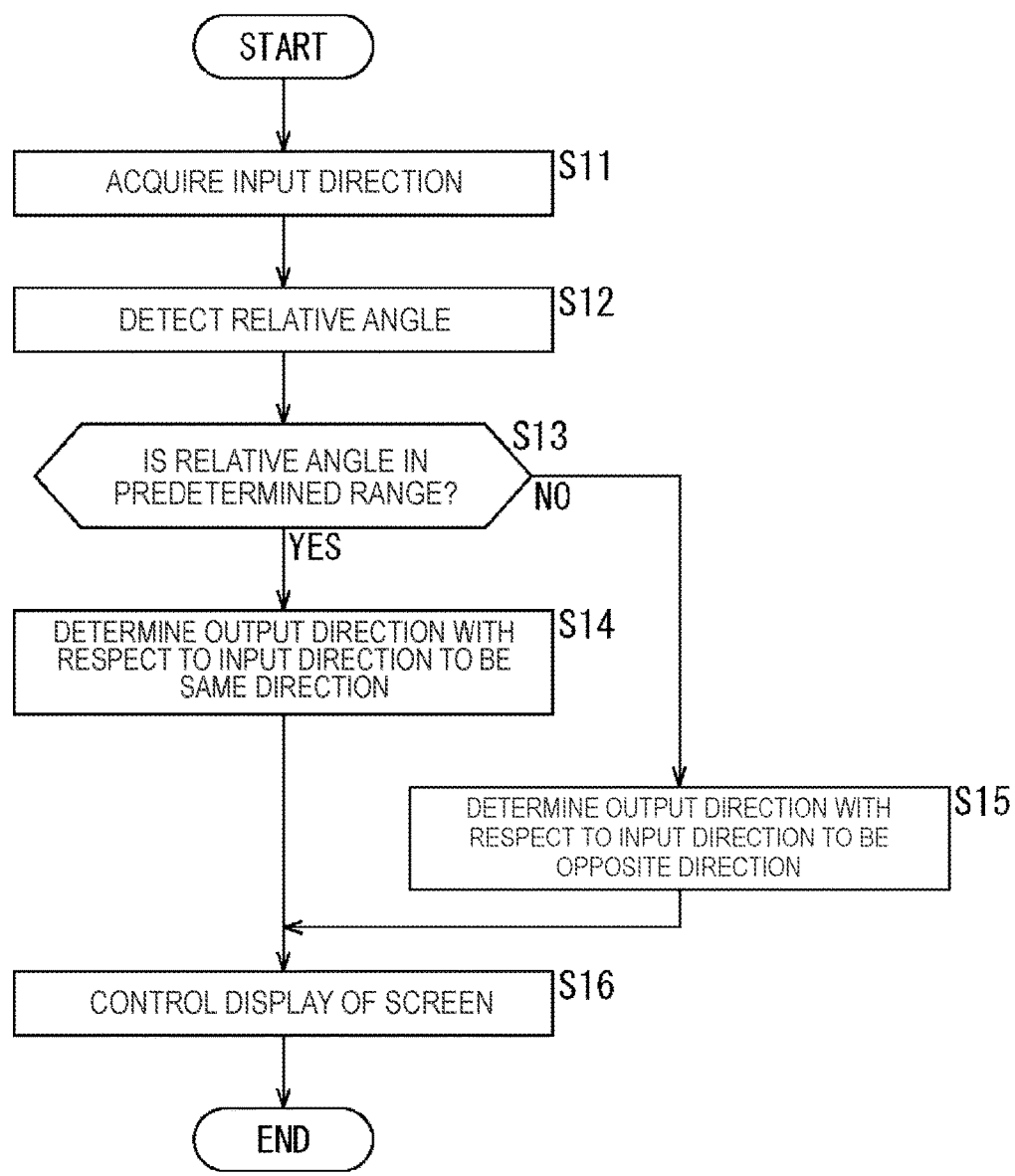

FIG. 9
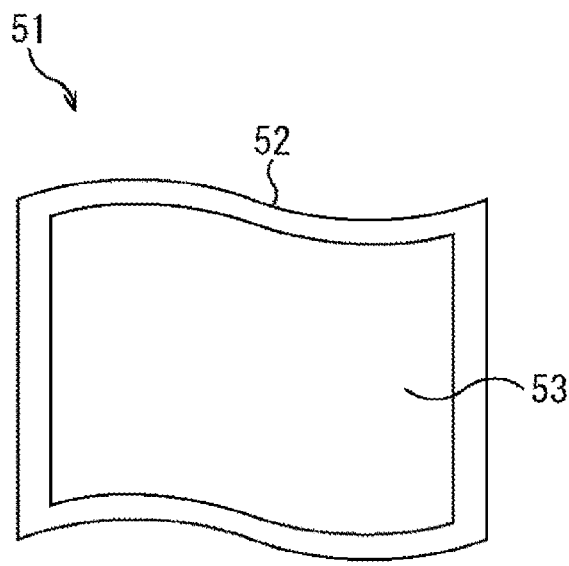
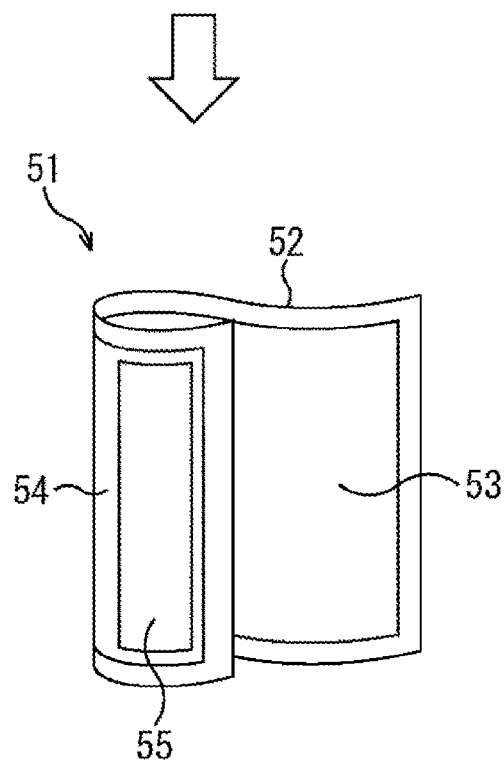

OPERATION PROCESSING DEVICE AND OPERATION PROCESSING METHOD FOR DISPLAYING IMAGE BASED ON ORIENTATION OF OUTPUT DIRECTION

CROSS-REFERENCE TO RELATED APPLICATIONS

The present application is a continuation application of U.S. patent application Ser. No. 14/409,620, filed Dec. 19, 2014, which is a National Stage Entry of PCT/JP2013/068081, filed Jul. 2, 2013, and claims the benefit of priority from prior Japanese Patent Application JP 2012-154229, filed Jul. 10, 2012, the entire content of which is hereby incorporated by reference.

TECHNICAL FIELD

The present disclosure relates to an information processing device, an operation processing method, and a program, and in particular, to an information processing device, an information processing method, and a program, capable of providing an easier-to-use user interface.

BACKGROUND ART

In the related art, a device, such as a note-type personal computer, including a display unit, such as a liquid crystal panel, and an input unit, such as a touch sensor, has been widely used. Typically, the note-type personal computer is configured such that a relative angle between the display unit and the input unit is in a range of 0° to 180° (in practical, a range of 30° to 180°, such as 120°). Therefore, when a user performs a touch operation on the input unit, it is possible for the user to perform the operation with no sense of incongruity by employing a user interface in which an input direction on the input unit is the same as an output direction in which a display of the display unit is changed.

On the other hand, the present applicant suggests a foldable type electronic device including a hinge part, in which the relative angle between the display unit and the input unit can have 180° or more (see, for example, Patent Literature 1).

In a case where such an electronic device uses a user interface in which the input direction and the output direction are the same direction, the user may feel that the output direction with respect to the input direction is the opposite direction when a relative position is in a range of 180° to 360° (in particular, around 360°). A device in which the relative angle between the display unit and the input unit is fixed to 360°, that is, a device including the input unit disposed at a rear surface side of the display unit uses a user interface in which the input direction and the output direction are the same direction.

CITATION LIST

Patent Literature

Patent Literature 1: JP 2012-057662A

SUMMARY OF INVENTION

Technical Problem

As mentioned above, when the user interface in which the input direction and the output direction are the same direction is used, it is difficult for the user to perform an operation with no sense of incongruity since the user feels that the output direction with respect to the input direction is the opposite direction. Accordingly, there is a need for an easier-to-use user interface that allows for an operation with no sense of incongruity.

The present disclosure has been made in view of this situation, and an object thereof is to provide an easier-to-use user interface.

Solution to Problem

According to an aspect of the present disclosure, there is provided an operation processing device including an input direction acquisition unit configured to acquire information indicating an input direction according to a direction generated in response to an operation indicating the direction which is performed on an input unit to which the operation is input, an output direction indication unit configured to indicate, to a display unit configured to display an image, an output direction that is a direction in which the image of the display unit is changed in response to the operation on the input unit, and a determination unit configured to determine an orientation of the output direction with respect to the input direction according to a relative position relationship between the input unit and the display unit.

According to an aspect of the present disclosure, there is provided a program for causing a computer to perform operation processing, the operation processing including the steps of acquiring information indicating an input direction according to a direction generated in response to an operation indicating the direction which is performed on an input unit to which the operation is input, indicating, to a display unit configured to display an image, an output direction that is a direction in which the image of the display unit is changed in response to the operation on the input unit, and determining an orientation of the output direction with respect to the input direction according to a relative position relationship between the input unit and the display unit.

According to an aspect of the present disclosure, information indicating an input direction according to a direction generated in response to an operation indicating the direction which is performed on an input unit to which the operation is input, an output direction indication unit configured to indicate, to a display unit configured to display an image is acquired. An output direction that is a direction in which the image of the display unit is changed in response to the operation on the input unit is indicated to a display unit configured to display an image. In addition, an orientation of the output direction with respect to the input direction according to a relative position relationship between the input unit and the display unit is determined.

Advantageous Effects of Invention

According to an aspect of the present disclosure, it is possible to provide an easier-to-use user interface.

BRIEF DESCRIPTION OF DRAWINGS

FIG. 5 is a flowchart explaining operation processing.

FIG. 9 is a view illustrating a menu screen displayed when a touch operation terminal is bent.

DESCRIPTION OF EMBODIMENTS

Hereinafter, specific embodiments to which the present technology is applied will be described in detail with reference to the drawings.

Figure 1:
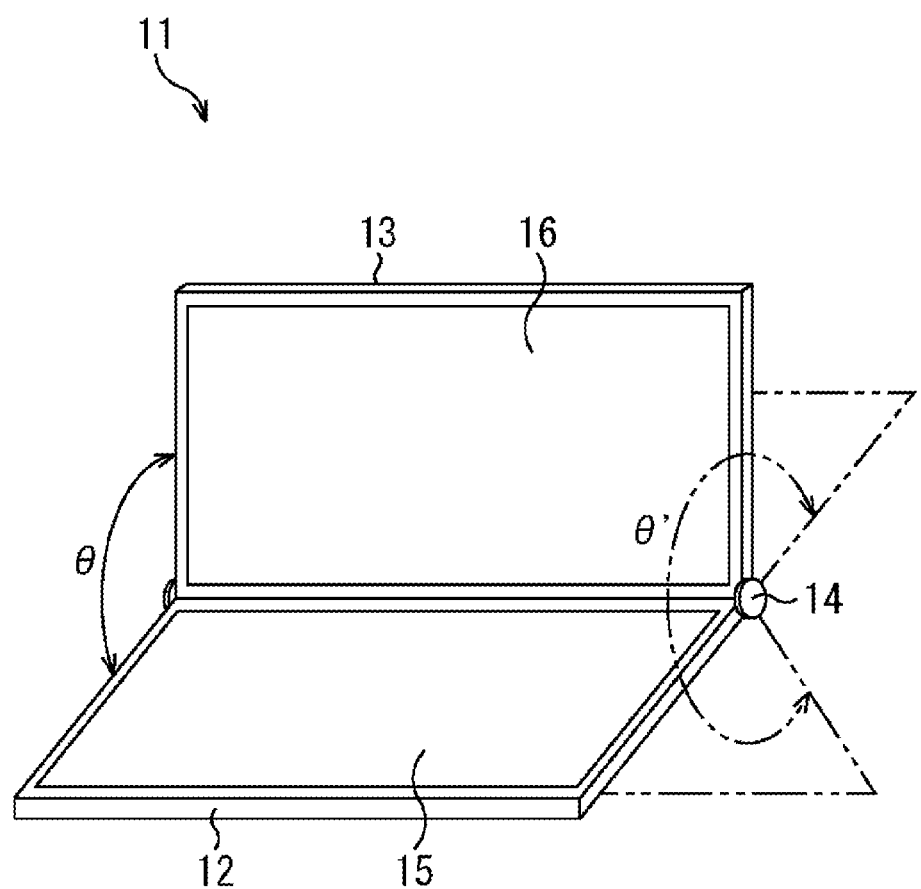
FIG. 1 is a perspective view illustrating an example configuration of a first embodiment of a touch operation terminal to which the present technology is applied.

FIG. 1 is a perspective view illustrating an example configuration according to a first embodiment of an information processing device to which the present technology is applied.

Referring to FIG. 1, a touch operation terminal 11 includes a first housing 12, a second housing 13, a hinge part 14, an input unit 15, and a display unit 16.

The input unit 15 is disposed in one side surface of the first housing 12, and the display unit 16 is disposed in the other side surface of the second housing 13. The first housing 12 and the second housing 13 are connected to be openable and closable through the hinge part 14 such that the input unit 15 and the display unit 16 face each other in a closed state. A relative position relationship between the first housing 12 and the second housing 13 can be changed around the hinge part 14.

For example, the touch operation terminal 11 is configured such that a relative angle θ between a front surface of the input unit 15 of the first housing 12 and a front surface of the display unit 16 of second housing 13 is changeable in a range of 0° to 360° around the hinge part 14. That is, the hinge part 14 connects the first housing 12 and the second housing 13 so as to be openable and closable in a range from an angle (0°) at which the input unit 15 and the display unit 16 face each other to an angle (360°) at which the input unit 15 and the display unit 16 face opposite sides. Thus, the touch operation terminal 11 is configured such that the front surface of the input unit 15 of the first housing 12 and the front surface of the display unit 16 of the second housing 13 are openable to 180° or more as indicated by a relative angle θ' in FIG. 1.

The input unit 15 detects a movement of a finger of a user by using, for example, a change in pressure applied on a front surface by the finger of the user or a change in static electricity due to contact on (or proximity to) the front surface of the finger of the user. For example, when the user performs an operation of indicating a direction by moving the finger in an arbitrary direction whiling touching the surface with the finger the input unit 15 (hereinafter, appropriately referred to as a swipe operation), the input unit 15 detects a movement of the finger of the user and acquires operation information that indicates an input direction according to a movement direction of the finger.

The display unit 16 is configured to have, for example, a crystal panel, an organic electro luminescence panel or the like, and displays a display screen which is an image in which display contents are configured by a picture, a photograph, a figure, a character, a graphical user interface (GUI) and the like. For example, the display unit 16 scrolls and displays the display screen or moves a pointer or a cursor displayed on the display screen, in the output direction based on the swipe operation of the user on the input unit 15 to change display of the display screen.

The touch operation terminal 11 is configured as mentioned above, and the user can adjust the first housing 12 and the second housing 13 so as to be a desired relative angle θ and use the touch operation terminal 11. Also, when the user performs the swipe operation on the input unit 15, the touch operation terminal 11 performs operation processing according to the swipe operation and controls the display of the display screen of the display unit 16, based on the operation information acquired by the input unit 15. For example, when the user performs the swipe operation of moving the finger in a horizontal direction, the touch operation terminal 11 performs operation processing such that the display screen of the display unit 16 is scrolled in the horizontal direction.

The touch operation terminal 11 performs a process of switching the output direction with respect to the input direction based on the relative angle θ between the first housing 12 and the second housing 13 in an operation processing of a swipe operation in a vertical direction.

Figure 2:
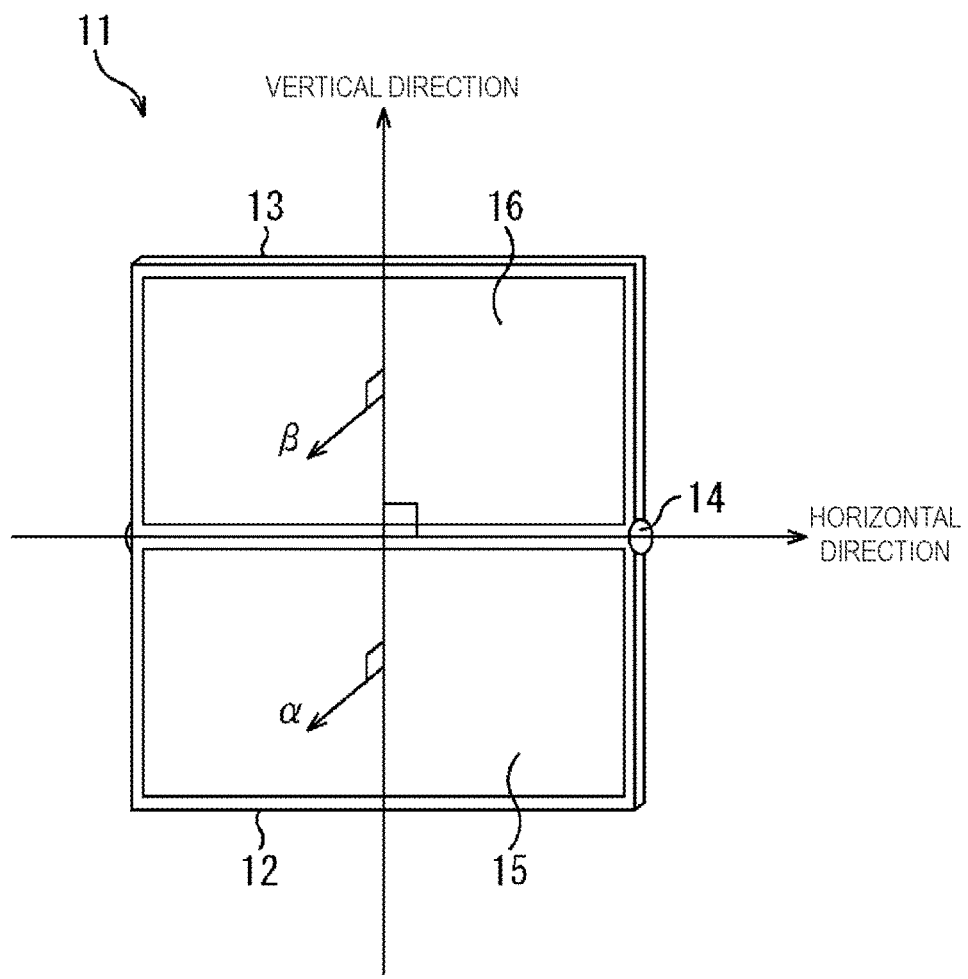
FIG. 2 is a view explaining a horizontal direction and a vertical direction in a touch operation terminal having a hinge part.

For example, it is assumed that a direction along the hinge part 14 is a horizontal direction in the touch operation terminal 11 including the hinge part 14, as illustrated in FIG. 2. Also, it is assumed that a direction perpendicular to the horizontal direction and also, perpendicular to a normal direction α of the input unit 15 in a front surface of the input unit 15 and a direction perpendicular to the horizontal direction and also, perpendicular to a normal direction β of the display unit 16 in a front surface of the display unit 16 are a vertical direction. That is, the vertical direction is a straight line when the relative angle θ is 180° as illustrated in FIG. 2 and is curved according to the relative angle θ when relative angle θ is an angle other than 180°.

Also, a predetermine range of the relative angle θ at which processing is performed such that the output direction with respect to the input direction is set in the touch operation terminal 11 with respect to a swipe operation in the vertical direction. The touch operation terminal 11 can switch the output direction with respect to the input direction depending on whether the relative angle θ is in the predetermined range. That is, the touch operation terminal 11 allows the output direction with respect to the input direction to be the same direction when the relative angle θ is in the predetermined range, and allows the output direction with respect to the input direction to be the opposite direction when the relative angle θ is not in the predetermined range. Additionally, the predetermined range is previously set by evaluating, for example, whether the user can perform the swipe operation with no sense of incongruity, in development stages.

Specifically, the predetermined range of 0° to 180° is set in the touch operation terminal 11. Therefore, when the relative angle θ is in a range of 0° to 180° (0°≤θ≤180°), the touch operation terminal 11 performs operation processing such that the output direction with respect to the input direction is the same direction with respect to the swipe operation in the vertical direction. On the other hand, when the relative angle θ is greater than 180° and is less than or equal to 360° (180°<θ≤360°), the touch operation terminal 11 performs operation processing such that the output direction with respect to the input direction is the opposite direction with respect to the swipe operation in the vertical direction.

Note that the touch operation terminal 11 performs operation processing such that the input direction and the output direction are not switched with respect to the horizontal direction in spite of a change in the relative angle θ (that is, when the input direction is a right direction, the output direction is always the right direction). Also, a swipe operation in the vertical direction includes not only a movement of a finger which is completely matched with the vertical direction but also a movement of the finger in a diagonal direction including a component of the vertical direction.

Next, the relationship between an input direction to the input unit 15 and an output direction in the display unit 16 will be described with reference to FIGS. 3A, 3B, 3C and 3D.

Figure 3A:
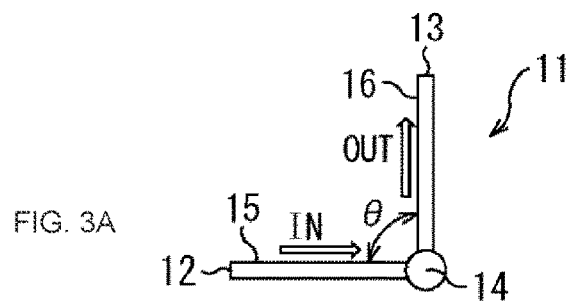
FIGS. 3A, 3B, 3C and 3D are views explaining a relationship between an input direction and an output direction.
Figure 3B:
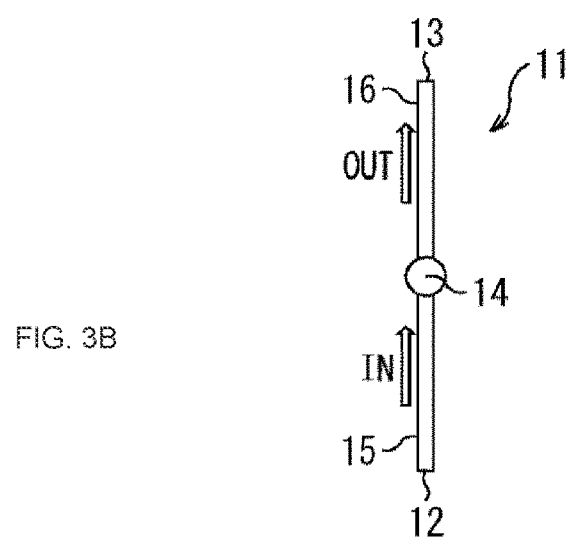
Figure 3C:
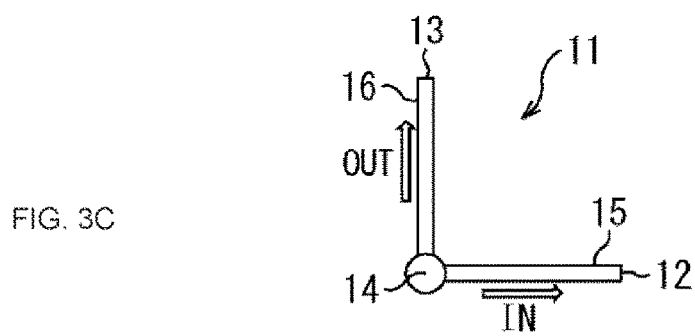

FIG. 3A illustrates the touch operation terminal 11 in which the relative angle θ is 90° and FIG. 3B illustrates the touch operation terminal 11 in which the relative angle θ is 180°. In FIG. 3C, there is illustrated the touch operation terminal 11 in which the relative angle θ is 270° and in FIG. 3D, there is illustrated the touch operation terminal 11 in which the relative angle θ is 360°.

In a case where the relative angle θ between the input unit 15 and the display unit 16 is 90° as illustrated in FIG. 3A, the touch operation terminal 11 performs operation processing such that the output direction OUT with respect to the input direction IN is the same direction. In a case where the relative angle θ between the input unit 15 and the display unit 16 is 180° as illustrated in FIG. 3B, the touch operation terminal 11 performs operation processing such that the output direction OUT with respect to the input direction IN is the same direction.

Figure 3D:
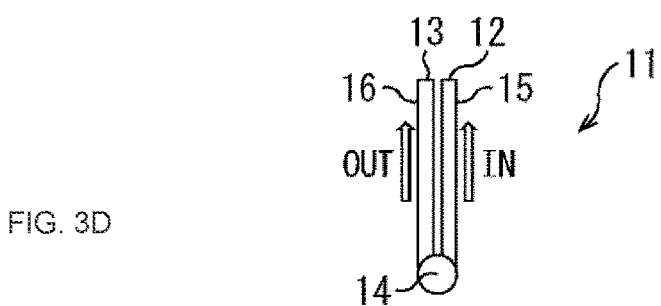

On the other hand, in a case where the relative angle θ between the input unit 15 and the display unit 16 is 270° as illustrated in FIG. 3C, the touch operation terminal 11 performs operation processing such that the output direction OUT with respect to the input direction IN is the opposite direction. Also, in a case where the relative angle θ between the input unit 15 and the display unit 16 is 360° as illustrated in FIG. 3D, that is, the display unit 16 is disposed in the rear surface side of the input unit 15, the touch operation terminal 11 performs operation processing such that the output direction OUT with respect to the input direction IN is the opposite direction (in this case, the opposite direction in a coordinate system in which the vertical direction is curved according to the relative angle θ, as described with reference to FIG. 2).

Thus, the touch operation terminal 11 perform operation processing which switches the output direction with respect to the input direction to the same direction or the opposite direction, depending on whether relative angle θ is in a range of 0° to 180°.

Figure 4:
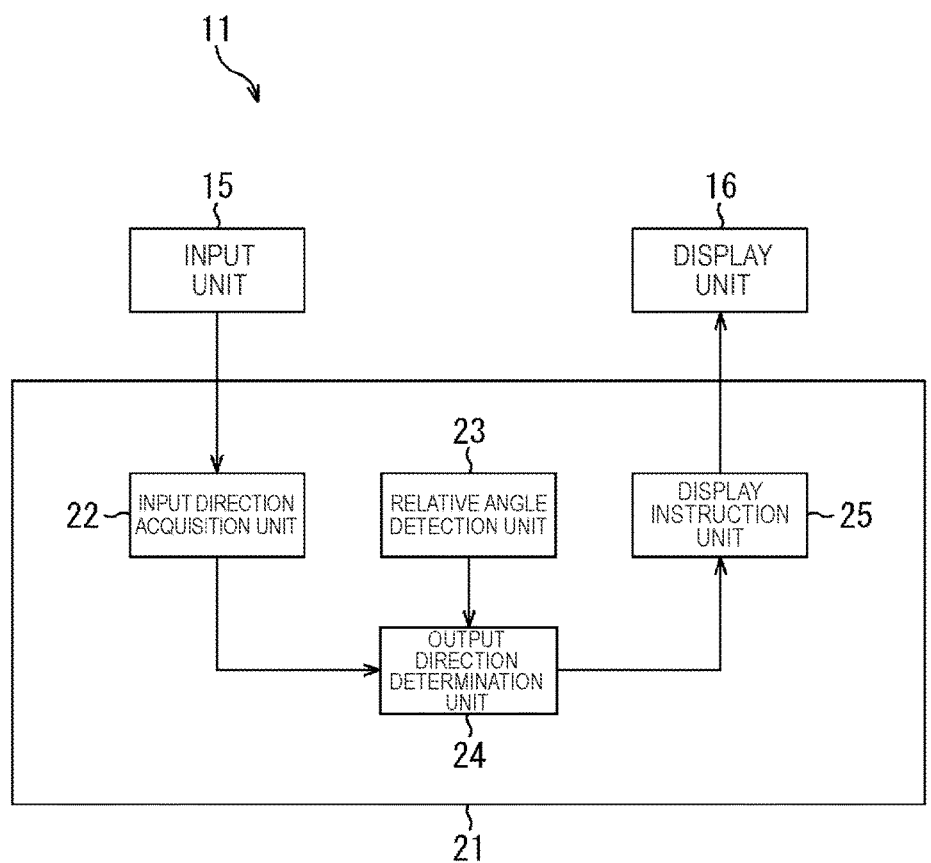
FIG. 4 is a block diagram illustrating an example functional configuration of an operation processing unit of a touch operation terminal.

Next, FIG. 4 is a block diagram illustrating an example functional configuration of an operation processing unit of the touch operation terminal 11.

As illustrated in FIG. 4, the operation processing unit 21 includes an input direction acquisition unit 22, a relative angle detection unit 23, an output direction determination unit 24, and a display instruction unit 25. Note that the operation processing unit 21 is configured by a central processing unit (CPU) embedded in the touch operation terminal 11, a read only memory (ROM), a random access memory (RAM), a non-volatile memory (for example, electronically erasable and programmable read only memory (EEPROM), or the like, and functions of the respective elements are realized when the CPU reads programs stored in the ROM or the non-volatile memory on the RAM and performs the programs.

The input direction acquisition unit 22 is connected to the input unit 15, and receives operation information from the input unit 15 on which a user performs a swipe operation and acquires an input direction in the swipe operation of the user, based on the operation information.

The relative angle detection unit 23 is connected to an angle sensor (not illustrated) attached to the hinge part 14 and detects a relative angle θ between the first housing 12 and the second housing 13.

When the input direction acquisition unit 22 acquires the input direction, the output direction determination unit 24 determines the orientation of the output direction (same direction or opposite direction) with respect to the input direction, based on the relative angle θ detected by the relative angle detection unit 23. That is, the output direction determination unit 24 performs a process of switching the orientation of the output direction with respect to the input direction depending on whether the relative angle θ is in the predetermined range. For example, the output direction determination unit 24 determines the output direction with respect to the input direction to be the same direction, as mentioned above when the relative angle θ is in the predetermined range (for example, 0°≤θ≤180°). On the other hand, the output direction determination unit 24 determines the output direction with respect to the input direction to be the opposite direction when the relative angle θ is not in the predetermined range.

The display instruction unit 25 is connected to the display unit 16 and supplies a control signal that instructs display of a display screen to the display unit 16 such that display on the display screen of the display unit 16 is changed in an output direction determined by the output direction determination unit 24. Therefore, the display unit 16 switches, for example, a direction in which the display screen is scrolled to the same or opposite direction as the input direction depending on whether the relative angle θ is in a predetermined range (for example, 0°≤θ≤180°).

The operation processing unit 21 is configured as mentioned above. According to the relative angle θ detected by the relative angle detection unit 23, the output direction is determined with respect to the input direction acquired by the input direction acquisition unit 22 and the display unit 16 is instructed to perform display in the output direction.

Next, FIG. 5 is a flowchart explaining operation processing which is performed by the operation processing unit 21.

For example, the input unit 15 waits in a state capable of detecting a touch operation of a user and, when detecting that a swipe operation is performed by the user, the processing is started. In step S11, the input unit 15 supplies operation information acquired based on the swipe operation of the user to the input direction acquisition unit 22. The input direction acquisition unit 22 acquires an input direction from the operation information and supplies the input direction to the output direction determination unit 24.

In step S12, the relative angle detection unit 23 detects a relative angle between the first housing 12 and the second housing 13 based on a signal that is output from the angle sensor (not illustrated) attached to the hinge part 14 and supplies the relative angle to the output direction determination unit 24.

In step S13, the output direction determination unit 24 determines whether the relative angle θ detected by the relative angle detection unit 23 in step S12 is in the predetermined range.

In step S13, when it is determined that the relative angle θ is in the predetermined range, the process proceeds to step S14, and the output direction determination unit 24 determines, as the output direction, the same direction as the input direction acquired by the input direction acquisition unit 22 in step S11 and performs notification to the display instruction unit 25.

On the other hand, in step S13, when the relative angle θ is not in the predetermined range, the process proceeds to step S15. In step S15, the output direction determination unit 24 determines, as the output direction, the opposite direction as the input direction acquired by the input direction acquisition unit 22 in step S11 and performs notification to the display instruction unit 25.

After the processing of step S14 or S15, the process proceeds to step S16 and the display instruction unit 25 supplies the display unit 16 with a control signal that instructs display of the display screen such that display on the display screen of the display unit 16 is changed in the output direction determined by the output direction determination unit 24. After the processing of step S16, the operation processing is ended.

As mentioned above, the touch operation terminal 11 determines the orientation of the output direction with respect to the input direction according to the relative angle θ and switches the output direction, thereby providing an easier-to-use user interface with no sense of incongruity upon operation of the user.

The touch operation terminal 11 may display an icon or an indicator on the display unit 16 so as to present, to the user, the switching of the orientation of the output direction with respect to the input direction. Also, it may be possible to enable the user to recognize that the orientation of the output direction with respect to the input direction is switched, through mechanism of the hinge part 14.

Also, the touch operation terminal 11 can apply the same operation processing to a zoom operation by detecting touches of a plurality of points, in addition to the swipe operation. It may be possible to change the relative angle θ of the input unit 15 and the display unit 16 by a mechanical configuration other than the hinge part 14. Furthermore, it may be possible to detect torsion of the input unit 15 and the display unit 16 to perform the operation processing.

Note that it is possible to apply not only a straight direction but also a rotational direction as the input direction and the output direction. For example, when the input direction is clockwise, the touch operation terminal 11 can determine a clockwise direction as the output direction when the relative angle θ is in the predetermined range, and determines a counterclockwise direction as the output direction when the relative angle θ is not in the predetermined range. The touch operation terminal 11 can detect touches of a plurality of points to input a rotation direction, and detect a touch of one point and detect a rotation of a finger that is touching the one point to input the rotation direction.

The angle of the predetermined range at which the output direction with respect to the input direction is switched is not limited to 180°, and can be set to an appropriate angle according to an application program that is executed in the touch operation terminal 11 and a structure of the touch operation terminal 11. The angle of the predetermined range may be different depending on operations of opening and closing between the input unit 15 and the display unit 16.

Furthermore, the touch operation terminal 11 can employ a configuration in which the input unit 15 and the display unit 16 are independent of each other, in addition to a configuration in which the input unit 15 and the display unit 16 are connected to each other through the hinge part 14. In this case, the input unit 15 and the display unit 16 respectively include an acceleration sensor to detect a relative position to enable the output direction with respect to the input direction to be switched.

Also, the input unit 15 is not limited to a device equipped with a touch sensor and it is possible to employ various types of input devices, such as a button, a dial, and a wheel, that is an input device capable of indicating a direction.

The touch operation terminal 11 can adjust a change amount by which the display on the display screen of the display unit 16 is changed, with respect to an input amount of the swipe operation on the input unit 15 (that is a movement amount by which the user moves a finger while maintaining a touched state), based on a magnitude of the relative angle θ. For example, the touch operation terminal 11 performs the operation processing to increases a scroll speed of the display screen with respect to the input amount of the swipe operation when the relative angle θ is large and to decrease the scroll speed of the display screen with respect to the input amount of the swipe operation when the relative angle θ is small. Similarly, the touch operation terminal 11 can perform the operation processing to adjust a speed at which a cursor on the display screen is moved with respect to the input amount of the swipe operation, according to the magnitude of the relative angle θ.

Furthermore, the touch operation terminal 11 can adjust the scroll speed of the display screen or adjust a speed at which the cursor that is displayed on the display screen is moved, according to the position relationship between the user and the display unit 16.

Figure 6A:
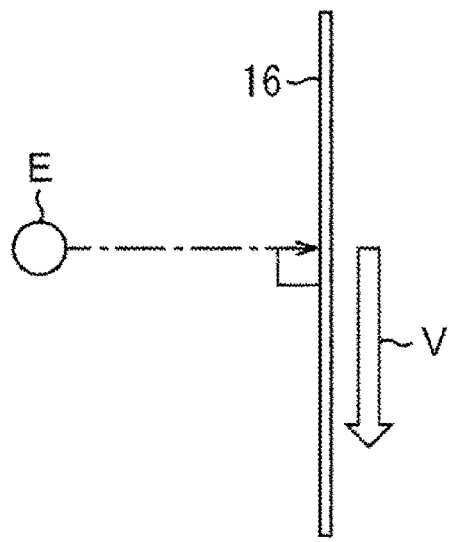
FIGS. 6A and 6B are views explaining adjustment of a scroll speed according to a position relationship with a user.
Figure 6B:
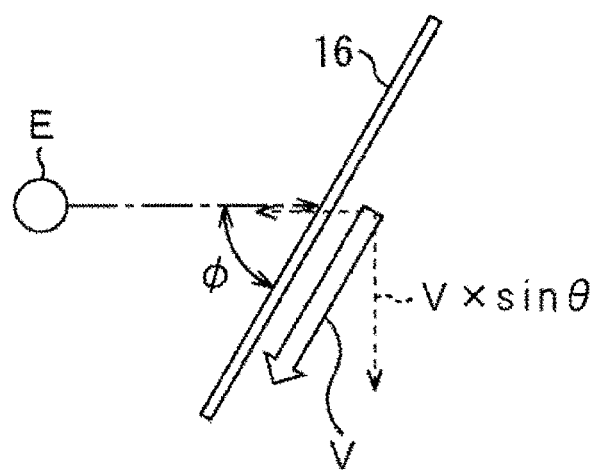

With reference to FIGS. 6A and 6B, there will be described a process that adjusts the scroll speed of the display screen in the display unit 16 according to the position relationship between the user and the display unit 16.

FIG. 6A illustrates a state where a user faces a front side of the display unit 16, and FIG. 6B illustrates a state where the user faces inclined to the display unit 16.

The touch operation terminal 11 can include, for example, an image pickup device (not illustrated) and detect the relative angle between an eye E of the user and the display unit 16 from an image picked up by the image pickup device. In the state where the user faces the front side of the display unit 16 (FIG. 6A), the relative angle between the eye E of the user and the display unit 16 is detected as being 90°, and the touch operation terminal 11 scrolls the display screen of the display unit 16 in the above-described output direction at a predetermined scroll speed V.

On the other hand, in the state (FIG. 6B) where the user faces inclined to the display unit 16, the relative angle between the eye E of the user and the display unit 16 is detected as being an angle φ. At this time, when the display screen is scrolled at the scroll speed V, a scroll speed in a vertical direction viewed by the user becomes V×Sin φ. That is, since the user faces inclined to the display unit 16, the scroll speed in the vertical direction is viewed as being slower than the scroll speed V in the state where the user faces the front side of the display unit 16.

Therefore, the touch operation terminal 11 sets the scroll speed V' after compensation to V'=V×(1/Sin φ) in order to compensate for an amount by which the scroll speed is reduced. In this way, the scroll speed in the vertical speed as being viewed by the user becomes a scroll speed V (=V×Sin φ×(1/Sin φ)). Thus, the touch operation terminal 11 can scroll the display screen of the display unit 16 at the scroll speed V' to which the scroll speed V is adjusted according to the angle φ.

In this way, the touch operation terminal 11 can adjust the scroll speed of the display screen of the display unit 16 with respect to the input amount of the swipe operation on the input unit 15, according to the angle φ, thereby providing the easier-to-use user interface.

Also, the touch operation terminal 11 may adjust a movement speed of a cursor displayed on the display unit 16 with respect to the input amount of the swipe operation on the input unit 15, according to the angle φ.

The touch operation terminal 11 is not limited to the configuration having the hinge part 14 as illustrated in FIG. 1. For example, the touch operation terminal 11 can employ a configuration having flexibility to be flexibly bendable at an arbitrary position and capable of changing the relative angle θ between the input unit 15 and the display unit 16 at an arbitrary position.

Figure 7A:
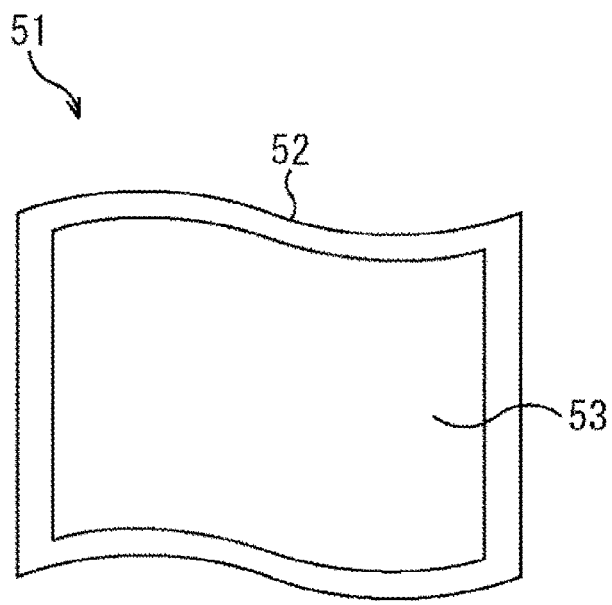
FIGS. 7A and 7B are perspective views illustrating an example configuration of a second embodiment of a touch operation terminal to which the present technology is applied.
Figure 7B:
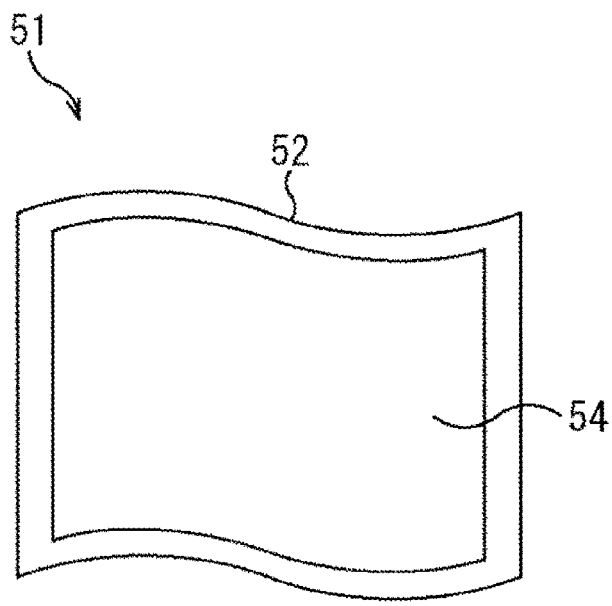

FIGS. 7A and 7B are perspective views illustrating an example configuration of a second embodiment of a touch operation terminal to which the present technology is applied. FIG. 7A illustrates a front surface side of the touch operation terminal 51, and FIG. 7B illustrates a rear surface side of the touch operation terminal 51.

The touch operation terminal 51 is entirely made of a thin body 52 that is flexible and bendable, and is configured such that the display unit 53 is disposed at the front surface side of the body 52 and the input unit 54 is disposed at the rear surface side of the body 52. That is, the display unit 53 and the input unit 54 are disposed to face opposite sides to each other.

In the operation processing of the touch operation terminal 51, the input direction and the output direction are opposite to each other similarly to a state where the relative angle θ is 360° as illustrated in FIG. 3D.

The display unit 53, which is a flexible display, controls display of the display screen in the output direction, the orientation of which is switched with respect to the input direction according to the relative angle θ similarly to the display unit 16 of FIG. 1. The input unit 54, which is a flexible touch panel, acquires operation information indicating the input direction according to the swipe operation of the user, similarly to the input unit 15 of FIG. 1. Although not illustrated, the touch operation terminal 51 includes the operation processing unit 21 (FIG. 2) which is implemented by a flexible board and is embedded in the body 52.

Figure 8:
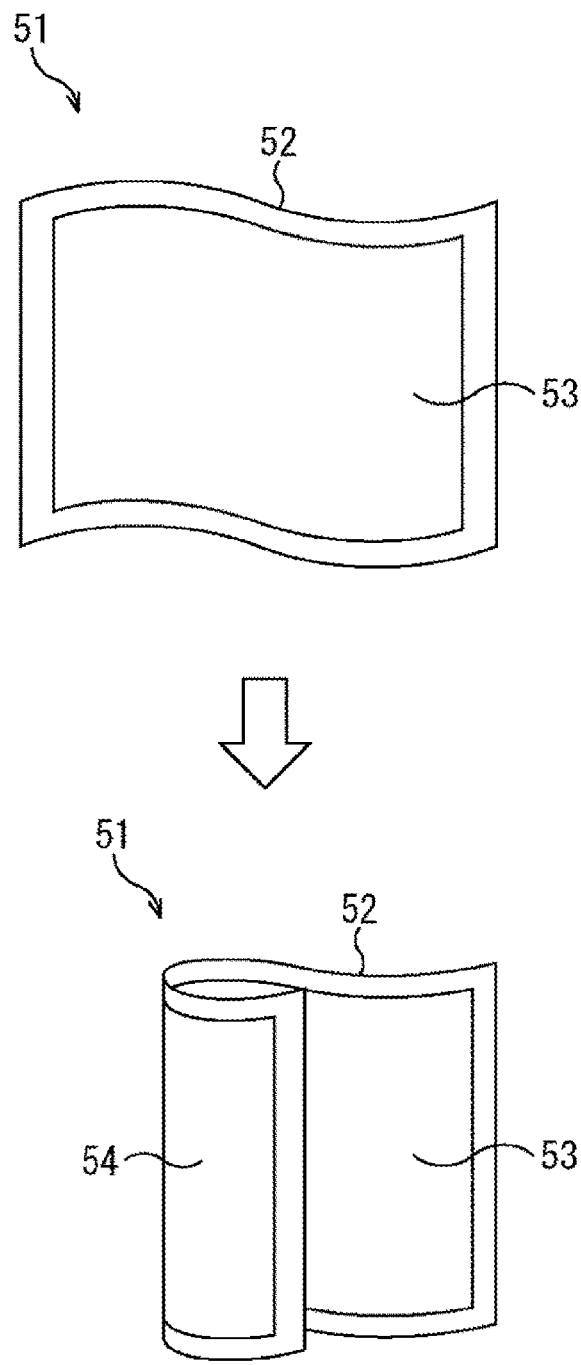
FIG. 8 is a view illustrating a state in which a touch operation terminal is bent.

As illustrated in FIG. 8, the touch operation terminal 51 can be flexibly bent at an arbitrary position and therefore, a portion of the input unit 54 can be in a state of facing in a direction toward the display unit 53 (toward the front surface). That is, when the touch operation terminal 51 is bent, the relative angle between the display unit 53 and the input unit 54 is changed, and the relative angle is detectable by the relative angle detection unit 23 of the operation processing unit 21. Therefore, when the relative angle detection unit 23 detects the relative angle at which the portion of the input unit 54 is in the state of facing the direction toward the display unit 53, an image is displayed on the portion of the input unit 54 (in FIG. 8, a portion facing the front of the paper) in the touch operation terminal 51. Also, the portion of the input unit 54 can input a swipe operation by a user.

In this case, the output direction with respect to the input direction is switched respectively upon the swipe operation on the portion of the input unit 54 facing the front surface side and the swipe operation on the portion of the input unit 54 facing the rear surface side. That is, the operation processing is performed on the portion of the input unit 54 which is determined as facing the front surface side according to the relative angle detected by the relative angle detection unit 23 such that the input direction is the same direction as the output direction.

Also, by bending the touch operation terminal 51, the portion of the input unit 54 faces the front surface side and an area of the rear portion of the touch operation terminal 51, that is, an area of the input unit 54 facing the rear surface side becomes narrow. The above configuration is similarly applied to a case where the touch operation terminal 51 is in a state of being bent in the opposite direction of FIG. 8, that is, a portion of the display unit 53 is in a state of facing a direction toward the input unit 54 (toward the rear surface side).

Additionally, the touch operation terminal 51 can change the user interface that is displayed when the display unit 53 and the input unit 54 are bent.

That is, as illustrated in FIG. 9, the touch operation terminal 51 can display a menu screen 55 used to perform an operation with respect to the display screen that is being displayed on the display unit 53 on a portion of the input unit 54 facing in the front surface side by bending the display unit 53 and the input unit 54. One or a plurality of graphical user interfaces (GUI) can be displayed on the menu screen 55.

Thus, in the touch operation terminal 51, the menu screen 55 is displayed when bending is detected. Additionally, the touch operation terminal 51 can detect a bendable position, change the size of the menu screen 55 according to the position, and change the number of GUIs to be displayed on the menu screen 55. Accordingly, when the portion of the input unit 54 that is facing the front surface side become large by bending the touch operation terminal 51, the menu screen 55 is largely displayed and many GUIs are displayed on the menu screen 55.

Also, the touch operation terminal 51 may adjust an output amount (for example, scroll speed) with respect to an input amount in addition to switching of the output direction with respect to the input direction, according to an angle at which the display unit 53 and the input unit 54 are bent. Furthermore, the touch operation terminal 51 is not only bent to be folded into two portions as illustrated in FIGS. 8 and 9, but is also capable of being folded to divided into three or four portions, and operation processing may be different according to respective folding methods.

The touch operation terminal 51 may employ a semi-transparent member as the display unit 53 and the input unit 54, so that the display unit 53 may be visible through the input unit 54 when the touch operation terminal 51 is bent.

It should be noted that each process described referring to the flowchart above includes a process that is not necessarily performed in a time series manner in the order described in the flowchart, but may be performed in a parallel or individual manner (for example, a paralleled process or a process by objects). In addition, the program may be processed by one CPU, or processed by a plurality of CPUs in a distributed manner.

The above-described series of processing (an information processing method) may be performed by hardware or may be performed by software. When the series of processing is performed by software, a program forming the software is installed into a computer that is incorporated in a dedicated hardware, or installed from a program storage medium on which programs are recorded into a general-purpose computer or the like that can perform various types of functions by installing various types of programs.

Figure 10:
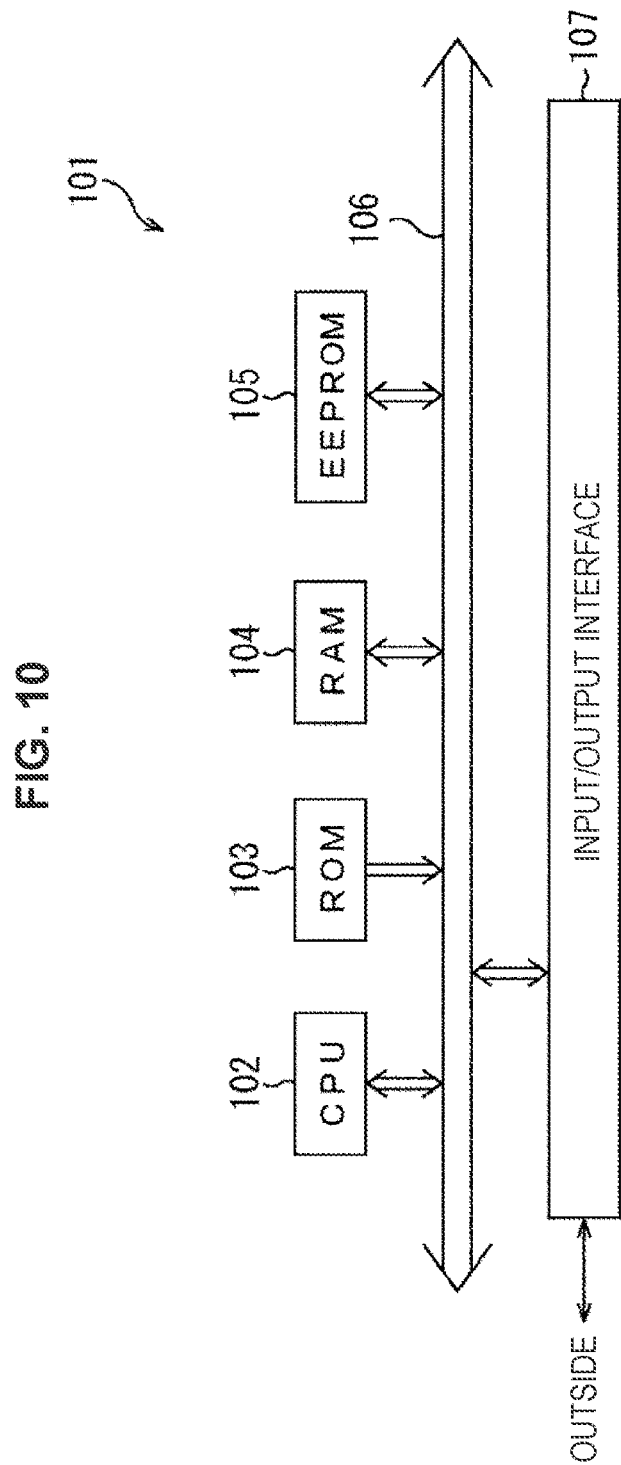
FIG. 10 is a block diagram showing an example configuration of a first embodiment of a computer to which the present technology is applied.

FIG. 10 is a block diagram showing an example configuration of the hardware of a computer that executes the series of processes described earlier according to a program.

In a computer 101, a CPU 102, a ROM 103, a RAM 104, and an EEPROM 105 are connected to one another through a bus 106. An input/output interface 107 is connected to the bus 106, and an external device, for example, the input unit 15 and the display unit 16 of FIG. 1 are connected to the input/output interface 107.

In the computer 101 configured as mentioned above, the CPU 102 loads a program stored in, for example, the ROM 103 or the EEPROM 105 into the RAM 104 through the bus 106 and executes the program, thereby performing the above-described series of processing. Also, the program which is executed by the computer (CPU 102) can be provided through, for example, non-illustrated other recording mediums which are previously stored in the ROM 103 and the EEPROM 105 or various types of communication networks, and can be installed in the EEPROM 105.

Additionally, the present technology may also be configured as below.

(1)

An operation processing device including:

an input direction acquisition unit configured to acquire information indicating an input direction according to a direction generated in response to an operation indicating the direction which is performed on an input unit to which the operation is input;

an output direction indication unit configured to indicate, to a display unit configured to display an image, an output direction that is a direction in which the image of the display unit is changed in response to the operation on the input unit; and a determination unit configured to determine an orientation of the output direction with respect to the input direction according to a relative position relationship between the input unit and the display unit.

(2)

The operation processing device according to (1), further including:

a connection part configured to connect the input unit and the display unit to be openable and closeable, wherein the determination unit determines the orientation of the output direction with respect to the input direction according to a relative angle between the input unit and the display unit with the connection part as a center.

(3)

The operation processing device according to (1) or (2), wherein the connection part connects the input unit and the display unit so as to be openable and closeable in a range from an angle at which the input unit and the display unit face each other to an angle at which the input unit and the display unit face opposite sides to each other.

(4)

The operation processing device according to any of (1) to (3), wherein an output amount in the output direction with respect to an input amount in the input direction is adjusted according to the relative position relationship between the input unit and the display unit.

(5)

The operation processing device according to any of (1) to (4), wherein an output amount in the output direction with respect to an input amount in the input direction is adjusted according to a relative position relationship between a user which performs input on the input unit and the display unit.

(6)

The operation processing device according to any of (1) to (5), wherein the input unit and the display unit are configured to have flexibility to be flexibly bendable at an arbitrary position and are disposed to face opposite sides to each other.

(7)

The operation processing device according to any of (1) to (6), wherein, when the input unit and the display unit are bent, and a portion of the input unit is in a state of facing in a direction toward the display unit, an image is displayed on the portion of the input unit facing in the same direction of the display unit.

(8)

The operation processing device according to any of (1) to (7), wherein an image that becomes an interface when an operation is performed on the image displayed on the display unit is displayed on the portion of the input unit facing in the same direction of the display unit.

(9)

The operation processing device according to any of (1) to (8), wherein content of an interface of an operation screen that is the image displayed on the portion of the input unit is changed according to a position at which the input unit and the display unit are bent.

Incidentally, the embodiment of the present disclosure is not limited to the above embodiment and various modifications may be made without departing from the spirit and scope of the present disclosure.

REFERENCE SIGNS LIST 11 touch operation terminal
12 first housing
13 second housing
14 hinge part
15 input unit
16 display unit
21 operation processing unit
22 input direction acquisition unit
23 relative angle detection unit
24 output direction determination unit
25 display instruction unit
51 touch operation terminal
52 body
53 display unit
54 input unit

The invention claimed is:

1. An operation processing device, comprising:
an input detector;
a display, wherein a position of the display is adjustable relative to a position of the input detector; and
a central processing unit (CPU) configured to:
receive operation information from the input detector;
determine an input direction on the input detector based on the received operation information;
determine an orientation of an output direction with respect to the input direction on the input detector, wherein the orientation of the output direction with respect to the input direction is determined based on the position of the display relative to the position of the input detector; and
control the display to move an image based on the determined orientation of the output direction.

2. The operation processing device according to claim 1, further comprising
a connection part configured to connect the input detector and the display to be openable and closeable relative to each other,
wherein the CPU is further configured to determine the orientation of the output direction with respect to the input direction based on a relative angle between the position of the input detector and the position of the display with the connection part as a center.

3. The operation processing device according to claim 1, further comprising
a connection part configured to connect the input detector and the display to be openable and closeable relative to each other,
wherein the input detector and the display are openable and closeable in a range from a first angle to a second angle,
wherein, at the first angle, the input detector and the display face each other, and
wherein, at the second angle, the input detector and the display are faced opposite to each other.

4. The operation processing device according to claim 1, wherein the CPU is further configured to control an output amount of a movement of the image in the output direction with respect to an input amount of a movement of an object in the input direction, and
wherein the output amount is controlled based on the position of the display relative to the position of the input detector.

5. The operation processing device according to claim 1, wherein the CPU is further configured to control an output amount of a movement of the image in the output direction with respect to an input amount of a movement of an object in the input direction, and
wherein the output amount is controlled based on the position of the display relative to a user position.

6. The operation processing device according to claim 1, wherein the input detector and the display are flexibly bendable and are opposite to each other.

7. The operation processing device according to claim 6, wherein, based on the input detector and the display being bent and a portion of the input detector facing toward the display, the CPU is further configured to display an interface on the portion of the input detector that faces the display.

8. The operation processing device according to claim 7, wherein, based on a touch operation on the image displayed on the display, the CPU is further configured to display the interface on the portion of the input detector that faces the display.

9. The operation processing device according to claim 8, wherein the CPU is further configured to change content of the interface of an operation screen based on a position at which the input detector and the display are bent.

10. The operation processing device according to claim 1, wherein the CPU is further configured to change the orientation of the output direction to be opposite to the input direction based on an angle between the position of the input detector and the position of the display.

11. The operation processing device according to claim 1, wherein the CPU is further configured to switch a scrolling direction of the image to one of a same direction or an opposite direction as the input direction, and
wherein the scrolling direction is switched based on an angle between the position of the input detector and the position of the display.

12. The operation processing device according to claim 1, wherein the CPU is further configured to:
detect a relative angle between an user's eye and the position of the display from a captured image; and
change an output amount of a movement of the image in the output direction with respect to an input amount of a movement of an object in the input direction,
wherein the output amount is changed based on the detected relative angle.

* * * * *